United States Patent
Carmel et al.

(10) Patent No.: US 9,014,471 B2
(45) Date of Patent: Apr. 21, 2015

(54) METHOD OF CLASSIFYING A CHROMA DOWNSAMPLING ERROR

(75) Inventors: Sharon Carmel, Ramat HaSharon (IL); Dror Gill, Haifa (IL); Tamar Shoham, Netanya (IL)

(73) Assignee: I.C.V.T. Ltd., Tel-Aviv (IL)

( * ) Notice: Subject to any disclaimer, the term of this patent is extended or adjusted under 35 U.S.C. 154(b) by 96 days.

(21) Appl. No.: 13/824,018

(22) PCT Filed: Sep. 15, 2011

(86) PCT No.: PCT/IL2011/000732
§ 371 (c)(1),
(2), (4) Date: Mar. 15, 2013

(87) PCT Pub. No.: WO2012/035533
PCT Pub. Date: Mar. 22, 2012

(65) Prior Publication Data
US 2013/0182952 A1    Jul. 18, 2013

Related U.S. Application Data

(60) Provisional application No. 61/383,750, filed on Sep. 17, 2010, provisional application No. 61/389,832, filed on Oct. 5, 2010.

(51) Int. Cl.
*G06K 9/00*    (2006.01)
*G06T 5/00*    (2006.01)
*G06T 7/00*    (2006.01)

(52) U.S. Cl.
CPC ............. *G06T 5/001* (2013.01); *G06T 7/0002* (2013.01); *G06T 2207/20021* (2013.01); *G06T 2207/20052* (2013.01); *G06T 2207/30168* (2013.01)

(58) Field of Classification Search
USPC ......... 382/162, 165, 167, 235, 239, 236, 250, 382/299; 375/240.2, 240.12, E7.022, 375/E7.076
See application file for complete search history.

(56) References Cited

U.S. PATENT DOCUMENTS 6,122,442 A    9/2000   Purcell et al.
6,233,359 B1    5/2001   Ratnakar et al.
(Continued)

FOREIGN PATENT DOCUMENTS

KR    20100073554 A    7/2010
WO    WO-2011135558 A1    11/2011

OTHER PUBLICATIONS

"JPEG"; Wikipedia, the free encyclopedia; 18 Pages; Sep. 17, 2010; http://en.wikipedia.org/wiki/JPEG.
(Continued)

*Primary Examiner* — Anh Do
(74) *Attorney, Agent, or Firm* — Harness, Dickey, & Pierce, PLC

(57) ABSTRACT

There is provided an apparatus and a method of evaluating an effect of chroma downsampling in a compression process of an input image. According to examples of the presently disclosed subject matter the method can include: computing an error for a target chroma downsampling ("CDS") block based on characteristics of DCT coefficients in the U and/or V planes of a respective CDS candidates group in the input image, and further based on a diversity of the DCT coefficients in the U and/or V planes of the respective CDS candidates group in the input image; and computing an estimated perceptual effect of CDS over the input image based on a plurality of target CDS blocks error values.

28 Claims, 9 Drawing Sheets

(56) References Cited

U.S. PATENT DOCUMENTS

| | | | |
|---|---|---|---|
| 6,252,994 | B1 | 6/2001 | Nafarieh |
| 6,459,732 | B2 | 10/2002 | Chen et al. |
| 6,647,061 | B1 * | 11/2003 | Panusopone et al. .... 375/240.12 |
| 6,982,762 | B1 | 1/2006 | Hui |
| 7,317,839 | B2 * | 1/2008 | Holcomb ............... 382/236 |
| 7,676,106 | B2 * | 3/2010 | Panusopone et al. ......... 382/250 |
| 8,537,899 | B1 * | 9/2013 | Taylor .................. 375/240.2 |
| 8,824,562 | B2 | 9/2014 | Kim et al. |
| 2001/0019630 | A1 | 9/2001 | Johnson |
| 2002/0157112 | A1 | 10/2002 | Kuhn |
| 2003/0035586 | A1 | 2/2003 | Chou et al. |
| 2004/0013195 | A1 | 1/2004 | Panusopone et al. |
| 2005/0175093 | A1 | 8/2005 | Haskell et al. |
| 2006/0133685 | A1 | 6/2006 | Wang et al. |
| 2007/0237221 | A1 | 10/2007 | Hsu et al. |

OTHER PUBLICATIONS

B. Planitz and A. Maeder; "Medical Image Watermarking: A Study on Image Degradation," e-Health Research Centre.

Chang, Ih-Hua, Pao-Chi Chang. and Tsan-Shyong Liu. "Adaptive subsampling JPEG image coding." Consumer Electronics, 1995., Proceedings of International Conference on IEEE; 1995; 264 Pages.

Chung, Kuo-Liang, et al. "Efficient chroma subsampling strategy for compressing digital time delay integration mosaic video sequences in H. 264/AVC." Journal of Electronic Imaging 20.2 (2011): pp. 023011-023011-15.

Kannan Ramchandran and Martin Vetterli, "Rate-Distortion Optimal Fast Thresholing with comlete JPEG/MPEG Decoder compatability", IEEE Transactions on Image Processing, vol. 3, No. 5 (Sep. 1994).

Lee, Yu-Hwe, Jar-Ferr Yang, and Jen-Fa Huang. "Perceptual activity meeasures computed from blocks in the transform domain." Signal processing 82.4 (2002): pp. 693-707.

Ramos, M. de Queiroz, R.L., "Adaptive rate-distortion-based thresholding: application in JPEG compression of mixed images for printing", Acoustics, Speech and Signal Processing, 1999, vol. 5.

Takeo Omari, Kazuhiko Fukazawa et al., "Novel Inspection Technology for Half Pitch 55 nm and Below," SPIE vol. 5752, pp. 174-182, 2005.

Z.Wang, A.C.Bovik, H.R.Sheikh, E.P. Simoncelli, "Image Quality Assessment: From Error Visibility to Structural Similarity", IEEE Transactions on Image Processing, vol. 13, No. 4, pp. 600-612, Apr. 2004.

* cited by examiner

| File # | Subjective CDS classification (*) | Number of blocks with maximal errors above THR1 | Number of blocks with maximal errors above THR2 | Number of blocks with maximal errors above THR3 |
|---|---|---|---|---|
| 1 | OK | 1125 | 9 | 1 |
| 2 | OK | 2300 | 7 | 0 |
| 3 | OK | 1091 | 5 | 0 |
| 4 | NOT OK | 1972 | 13 | 2 |
| 5 | NOT OK | 3204 | 76 | 1 |
| 6 | NOT OK | 2179 | 23 | 0 |

FIG. 3

| 105 | 81 | 0 | -34 | 40 | 0 | 0 | 0 | 42 | 117 | -38 | 0 | 0 | 0 | 0 | 0 |
|---|---|---|---|---|---|---|---|---|---|---|---|---|---|---|---|
| -90 | 108 | -19 | -56 | 42 | 0 | 0 | 0 | 36 | -36 | 19 | 0 | 0 | 0 | 0 | 0 |
| -38 | 38 | 0 | -28 | 0 | 0 | 0 | 0 | 76 | -114 | 28 | 0 | -24 | 0 | 0 | 0 |
| 0 | 0 | 0 | 0 | 0 | 0 | 0 | 0 | -34 | 28 | 0 | 0 | 24 | 0 | 0 | 0 |
| 20 | 0 | 0 | 0 | 0 | 0 | 0 | 0 | -40 | 28 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 182 | 9 | 0 | 0 | 0 | 0 | 0 | 0 | 161 | -18 | 19 | 0 | 0 | 0 | 0 | 0 |
| 9 | 12 | 0 | 0 | 0 | 0 | 0 | 0 | -45 | -12 | 19 | 0 | 0 | 0 | 0 | 0 |
| 0 | -19 | 0 | 0 | 0 | 0 | 0 | 0 | -38 | -19 | 0 | 0 | 0 | 0 | 0 | 0 |
| 0 | 0 | 0 | 0 | 0 | 0 | 0 | 0 | 0 | 0 | -28 | 0 | 0 | 0 | 0 | 0 |
| 0 | 0 | 0 | 0 | 0 | 0 | 0 | 0 | 0 | 0 | -24 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

605

| 157 | 154 | 165 | 163 | 114 | 58 | 61 | 103 | 142 | 141 | 139 | 137 | 138 | 143 | 147 | 149 |
|---|---|---|---|---|---|---|---|---|---|---|---|---|---|---|---|
| 153 | 148 | 156 | 157 | 118 | 71 | 73 | 108 | 143 | 149 | 150 | 147 | 148 | 155 | 156 | 151 |
| 155 | 146 | 149 | 155 | 133 | 99 | 99 | 123 | 148 | 155 | 156 | 149 | 143 | 139 | 130 | 119 |
| 161 | 149 | 149 | 157 | 151 | 132 | 130 | 144 | 156 | 153 | 149 | 142 | 124 | 98 | 76 | 65 |
| 160 | 149 | 146 | 154 | 157 | 152 | 150 | 154 | 161 | 147 | 142 | 142 | 119 | 78 | 52 | 48 |
| 153 | 146 | 141 | 145 | 152 | 155 | 155 | 154 | 156 | 145 | 144 | 148 | 133 | 101 | 81 | 81 |
| 150 | 148 | 144 | 142 | 147 | 154 | 156 | 154 | 142 | 146 | 148 | 146 | 141 | 133 | 123 | 115 |
| 153 | 154 | 150 | 145 | 148 | 157 | 160 | 157 | 130 | 147 | 150 | 137 | 136 | 147 | 143 | 125 |
| 152 | 152 | 152 | 152 | 152 | 152 | 152 | 152 | 122 | 125 | 129 | 134 | 138 | 141 | 142 | 143 |
| 154 | 154 | 153 | 153 | 152 | 151 | 150 | 150 | 144 | 138 | 130 | 126 | 128 | 138 | 150 | 158 |
| 157 | 156 | 154 | 153 | 151 | 149 | 147 | 147 | 159 | 150 | 138 | 130 | 131 | 141 | 155 | 165 |
| 157 | 157 | 155 | 152 | 150 | 147 | 146 | 145 | 157 | 155 | 152 | 149 | 149 | 151 | 154 | 156 |
| 156 | 155 | 153 | 151 | 149 | 147 | 146 | 145 | 152 | 155 | 159 | 161 | 161 | 157 | 152 | 149 |
| 152 | 151 | 151 | 150 | 150 | 149 | 148 | 148 | 154 | 155 | 156 | 157 | 157 | 156 | 154 | 153 |
| 147 | 147 | 148 | 149 | 150 | 151 | 152 | 152 | 152 | 151 | 150 | 150 | 151 | 153 | 155 | 157 |
| 144 | 144 | 146 | 148 | 150 | 152 | 154 | 155 | 145 | 146 | 147 | 149 | 150 | 152 | 154 | 155 |

| 154 | 159 | 91 | 85 | 143 | 144 | 147 | 152 |
|---|---|---|---|---|---|---|---|
| 153 | 152 | 129 | 124 | 153 | 149 | 125 | 97 |
| 151 | 147 | 154 | 155 | 152 | 145 | 108 | 65 |
| 151 | 145 | 152 | 155 | 141 | 145 | 139 | 126 |
| 153 | 152 | 152 | 150 | 135 | 130 | 136 | 149 |
| 157 | 154 | 149 | 147 | 154 | 142 | 143 | 157 |
| 154 | 151 | 149 | 147 | 154 | 158 | 158 | 152 |
| 146 | 148 | 151 | 153 | 149 | 149 | 152 | 155 |

620

| 123 | 38 | -2 | 33 | -4 | -12 | -6 | 2 |
|---|---|---|---|---|---|---|---|
| -55 | 26 | 0 | 46 | -11 | -18 | -10 | 2 |
| -4 | -33 | 30 | 27 | -4 | -23 | -11 | 4 |
| 8 | -35 | 56 | -3 | 12 | -23 | -9 | 3 |
| 0 | -27 | 35 | -16 | 6 | -3 | -5 | -4 |
| 7 | -14 | 7 | 8 | -3 | 1 | -1 | -1 |
| -6 | 9 | -6 | -1 | 5 | -4 | -1 | 0 |
| -9 | 11 | -5 | 0 | -3 | 1 | 0 | -1 |

625

630

| 70 | -99 | 0 | 68 | 60 | 0 | 0 | 0 | 167 | -26 | 0 | 0 | 0 | 0 | 0 | 0 |
|---|---|---|---|---|---|---|---|---|---|---|---|---|---|---|---|
| 0 | -12 | 0 | 0 | 0 | 0 | 0 | 0 | 0 | 24 | 19 | 0 | 0 | 0 | 0 | 0 |
| 95 | 95 | 0 | -42 | -60 | -24 | 0 | 0 | -19 | -19 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| -40 | -42 | 0 | 0 | 24 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 |

635

640

| 141 | 147 | 140 | 141 | 155 | 153 | 147 | 155 | 150 | 148 | 145 | 144 | 144 | 147 | 150 | 153 |
|---|---|---|---|---|---|---|---|---|---|---|---|---|---|---|---|
| 151 | 146 | 138 | 142 | 156 | 158 | 150 | 147 | 153 | 152 | 149 | 148 | 148 | 149 | 151 | 152 |
| 138 | 104 | 100 | 133 | 155 | 154 | 149 | 150 | 154 | 153 | 152 | 151 | 151 | 151 | 152 | 152 |
| 111 | 47 | 49 | 120 | 153 | 143 | 145 | 162 | 150 | 150 | 152 | 153 | 153 | 153 | 153 | 152 |
| 112 | 48 | 50 | 120 | 153 | 142 | 144 | 161 | 142 | 144 | 148 | 151 | 154 | 155 | 154 | 154 |
| 141 | 107 | 102 | 133 | 154 | 152 | 147 | 146 | 133 | 137 | 143 | 149 | 153 | 155 | 156 | 155 |
| 155 | 150 | 140 | 143 | 155 | 155 | 146 | 142 | 127 | 132 | 139 | 147 | 153 | 156 | 156 | 156 |
| 147 | 152 | 143 | 142 | 154 | 150 | 142 | 149 | 150 | 148 | 145 | 144 | 144 | 147 | 150 | 153 |

645

| 143 | 142 | 152 | 151 | 149 | 144 | 145 | 151 |
| --- | --- | --- | --- | --- | --- | --- | --- |
| 148 | 141 | 156 | 150 | 152 | 149 | 149 | 151 |
| 119 | 117 | 154 | 150 | 153 | 152 | 151 | 152 |
| 75 | 84 | 149 | 152 | 152 | 152 | 153 | 153 |
| 76 | 85 | 148 | 151 | 145 | 149 | 154 | 154 |
| 122 | 118 | 153 | 146 | 136 | 146 | 154 | 156 |
| 152 | 143 | 154 | 143 | 130 | 143 | 155 | 156 |
| 149 | 144 | 150 | 146 | 149 | 144 | 145 | 151 |

↖ 650

| 118 | -71 | -39 | -36 | -2 | 21 | 25 | 16 |
| --- | --- | --- | --- | --- | --- | --- | --- |
| 5 | -2 | -16 | 2 | 4 | -5 | 0 | 2 |
| 43 | 71 | 48 | 22 | 7 | -13 | -13 | -7 |
| -5 | 0 | 9 | -6 | -3 | 5 | 0 | -4 |
| -21 | -26 | -27 | -8 | 3 | -3 | 0 | 2 |
| -2 | -1 | 5 | -3 | -3 | 3 | 0 | -2 |
| 0 | 1 | -3 | 1 | 2 | -3 | 0 | 1 |
| -1 | 0 | 2 | -1 | -1 | 1 | -1 | -1 |

↖ 655

← 660

METHOD OF CLASSIFYING A CHROMA DOWNSAMPLING ERROR

CROSS REFERENCE TO RELATED APPLICATIONS

This application incorporates herein by reference the entire disclosure of U.S. Provisional Application No. 61/383,750, filed on Sep. 17, 2010.

FIELD OF THE INVENTION

The present invention is in the field of image processing.

BACKGROUND OF THE INVENTION

It is widely acknowledged that the human visual system is much more sensitive to variations in brightness than color. Chroma downsampling is based on this principle. Chroma downsampling involves encoding images by implementing lower resolution for Chroma information than for Luma information and is widely adopted in the field of digital image compression. Many digital SLR cameras use 2×1 chroma subsampling, and some point and shoot digital cameras use 2×2 chroma subsampling. Some graphics programs (such as Photoshop) sometimes use 2×2 (4:2:0) chroma subsampling.

In Towards Better Chroma Subsampling (published in SMPTE Motion Imaging Journal, 2008 5/6 May/June), Glenn Chan submits that chroma downsampling is not visually lossless in all situations and examines sources of chroma subsampling artifacts. Chen discloses a technique for extracting higher quality from existing chroma subsampled signals by minimizing out of gamut colors.

SUMMARY OF THE INVENTION

The method or apparatus according to the subject matter of the present application can have features of different aspects described above or below, or their equivalents, in any combination thereof, which can also be combined with any feature or features of the method or apparatus described in the Detailed Description presented below, or their equivalents.

There is provided in accordance with an aspect of the claimed subject matter a method of evaluating an effect of chroma downsampling in a compression process of an input image. According to an example of the claimed subject matter the method of evaluating an effect of chroma downsampling in a compression process of an input image can include: computing an error for a target CDS block based on characteristics of DCT coefficients in the U and/or V planes of a respective CDS candidates group in the input image, and further based on a diversity of the DCT coefficients in the U and/or V planes of the respective CDS candidates group in the input image; and computing an estimated perceptual effect of CDS over the input image based on a plurality of target CDS blocks error values.

According to an example of the claimed subject matter, the characteristics include an average of DCT coefficients in the U and/or V planes of the respective CDS candidates group. According to a further example, the diversity is characterized by a difference between values of DCT coefficients in the U and/or V planes of each member block in the respective CDS candidates group and the average. According to yet another example, the characteristics are an average of DCT DC coefficients in the U and/or V planes of the respective CDS candidates group. According to yet a further example, diversity is based on a maximum difference between DCT DC values in the U and/or V planes of each one of the respective CDS candidates group and the average of DCT DC coefficients in the U and/or V planes of the respective CDS candidates group. According to still a further example, the diversity is a maximum squared difference between DCT DC values in the U and/or V planes of each member block in the respective CDS candidates group and the average of DCT DC coefficients in the U and/or V planes of the respective CDS candidates group.

Further by way of example of the claimed subject matter, computing an estimated perceptual effect of CDS over the input image includes summing a plurality of error values associated with a respective plurality of target CDS blocks.

According to a further example of the claimed subject matter, the method can further include: applying a CDS control threshold; and controlling chroma-downsampling during compression of the input image based on a relation among the CDS control threshold and the CDS error for the input image.

Still further by way of example, the compression process supports a plurality of chroma downsampling modes, and wherein computing an error for a target CDS block, computing an estimated perceptual effect of CDS over the input image, and applying a CDS control threshold, are implemented and configured one or more times to provide a selection among the plurality of chroma downsampling modes. For example, during a first application of computing an error for a target CDS block, computing an estimated perceptual effect of CDS over the input image, and applying a CDS control threshold, it is determined whether a first mode of chroma downsampling should be applied or not, and wherein during the first application, the CDS candidates group is defined in accordance with the first mode of chroma downsampling. Still further by way of example, during a second application of computing an error for a target CDS block, computing an estimated perceptual effect of CDS over the input image, and applying a CDS control threshold, it is determined whether a second chroma downsampling mode should be applied or not, and wherein the CDS candidates group is defined according to the second mode of chroma downsampling.

According to an example of the claimed subject matter, computing an error for a target CDS block, computing an estimated perceptual effect of CDS over the input image, and applying a CDS control threshold are applied to and are based on DCT coefficients in the V plane only.

According to a further example of the claimed subject matter, the characteristics include an average of DCT DC coefficients in the V plane of the respective CDS candidates group. According to a further example of the claimed subject matter, the diversity is characterized by a difference between values of DCT DC coefficients in the V plane of each member block in the respective CDS candidates group and the average. Further by way of example the characteristics are an average of DCT DC coefficients in the V plane of the respective CDS candidates group. Still further by way of example, the diversity is based on a maximum difference between DCT DC values in the V plane of each one of the respective CDS candidates group and the average of DCT DC coefficients in the V plane of the respective CDS candidates group. Still further by way of example the diversity is a maximum squared difference between DCT DC values in the V plane of each member block in the respective CDS candidates group and the average of DCT DC coefficients in the V plane of the respective CDS candidates group.

According to a further aspect of the claimed subject matter, there is provided a program storage device readable by machine, tangibly embodying a program of instructions executable by the machine to perform a method of evaluating an effect of chroma downsampling in a compression process of an input image. According to an example of the claimed subject matter, a program storage device readable by machine, tangibly embodying a program of instructions executable by the machine to perform a method of evaluating an effect of chroma downsampling in a compression process of an input image, can include: computing an error for a target CDS block based on characteristics of DCT coefficients in the U and/or V planes of a respective CDS candidates group in the input image, and further based on a diversity of the DCT coefficients in the U and/or V planes of the respective CDS candidates group in the input image; and computing an estimated perceptual effect of CDS over the input image based on a plurality of target CDS blocks error values.

According to yet a further aspect of the claimed subject matter there is provided a computer program product including a computer useable medium having computer readable program code embodied therein of evaluating an effect of chroma downsampling in a compression process of an input image. According to an example of the claimed subject matter, the computer program product can include computer readable program code for causing the computer to compute an error for a target CDS block based on characteristics of DCT coefficients in the U and/or V planes of a respective CDS candidates group in the input image, and further based on a diversity of the DCT coefficients in the U and/or V planes of the respective CDS candidates group in the input image; and computer readable program code for causing the computer to compute an estimated perceptual effect of CDS over the input image based on a plurality of target CDS blocks error values.

According to still a further aspect of the claimed subject matter, there is provided a computerized apparatus for evaluating an effect of chroma downsampling in a compression process of an input image. According to an example of the claimed subject matter, the apparatus for evaluating an effect of chroma downsampling in a compression process of an input image may include a CDS coefficients extractor and a CDS evaluation module. The CDS coefficients extractor can be adapted to obtain DCT coefficients corresponding to the input image. The CDS evaluation module can be adapted to compute an error for a target CDS block based on characteristics of DCT coefficients in the U and/or V planes of a respective CDS candidates group in the input image, and further based on a diversity of the DCT coefficients in the U and/or V planes of the respective CDS candidates group in the input image. The CDS evaluation module can be further adapted to compute an estimated perceptual effect of CDS over the input image based on a plurality of target CDS blocks error values.

According to an example of the claimed subject matter, the characteristics include an average of DCT coefficients in the U and/or V planes of the respective CDS candidates group. Further by way of example, the diversity is characterized by a difference between values of DCT coefficients in the U and/or V planes of each member block in the respective CDS candidates group and the average. Still further by way of example, the characteristics are an average of DCT DC coefficients in the U and/or V planes of the respective CDS candidates group. Still further by way of example, the diversity is based on a maximum difference between DCT DC values in the U and/or V planes of each one of the respective CDS candidates group and the average of DCT DC coefficients in the U and/or V planes of the respective CDS candidates group. Still further by way of example, the diversity is a maximum squared difference between DCT DC values in the U and/or V planes of each member block in the respective CDS candidates group and the average of DCT DC coefficients in the U and/or V planes of the respective CDS candidates group.

According to an example of the claimed subject matter, the CDS evaluation module is adapted to sum a plurality of error values associated with a respective plurality of target CDS blocks as part of the estimation of the perceptual effect of CDS over the input image. According to a further example, the CDS evaluation module is adapted to apply a CDS control threshold, and the CDS evaluation module is configured to issue a recommendation with regard to a possibility of applying of CDS over the input image based on a relation among the CDS control threshold and the CDS error for the input image.

Still further by way of example, the CDS evaluation module is configured to evaluate a plurality of chroma downsampling modes, and is adapted to compute an error for a target CDS block, and to compute an estimated perceptual effect of CDS over the input image, and to apply a CDS control threshold one or more times to provide a selection among the plurality of chroma downsampling modes.

Yet further by way of example, the CDS evaluation module is adapted to initially evaluate in a first evaluation an application of a first mode of CDS over the input image, and wherein during the first evaluation the CDS evaluation module is configured to relate to CDS candidates groups which are defined in accordance with the first mode of chroma downsampling. For example, the CDS evaluation module is adapted to evaluate in a second evaluation an application of a second mode of CDS over the input image, and wherein during the second evaluation the CDS evaluation module is configured to relate to CDS candidates groups which are defined in accordance with the second mode of chroma downsampling.

By way of example, the CDS evaluation module is configured to compute an error for a target CDS block and to compute an estimated perceptual effect of CDS over the input image based on DCT coefficients in the V plane only. For example, the CDS evaluation module is configured to compute an error for a target CDS block and to compute an estimated perceptual effect of CDS over the input image based on DCT DC coefficients in the V plane only.

BRIEF DESCRIPTION OF THE DRAWINGS

In order to understand the invention and to see how it may be carried out in practice, a preferred embodiment will now be described, by way of non-limiting example only, with reference to the accompanying drawings, in which:

FIG. 3 is a graphical illustration of a data structure in which the results of a subjective CDS classification are listed for a plurality of image files, and for each of the plurality of image files, there is recorded the results of an application of three different thresholds for evaluating CDS target block error, according to an example of the claimed subject matter;

Figure 1:
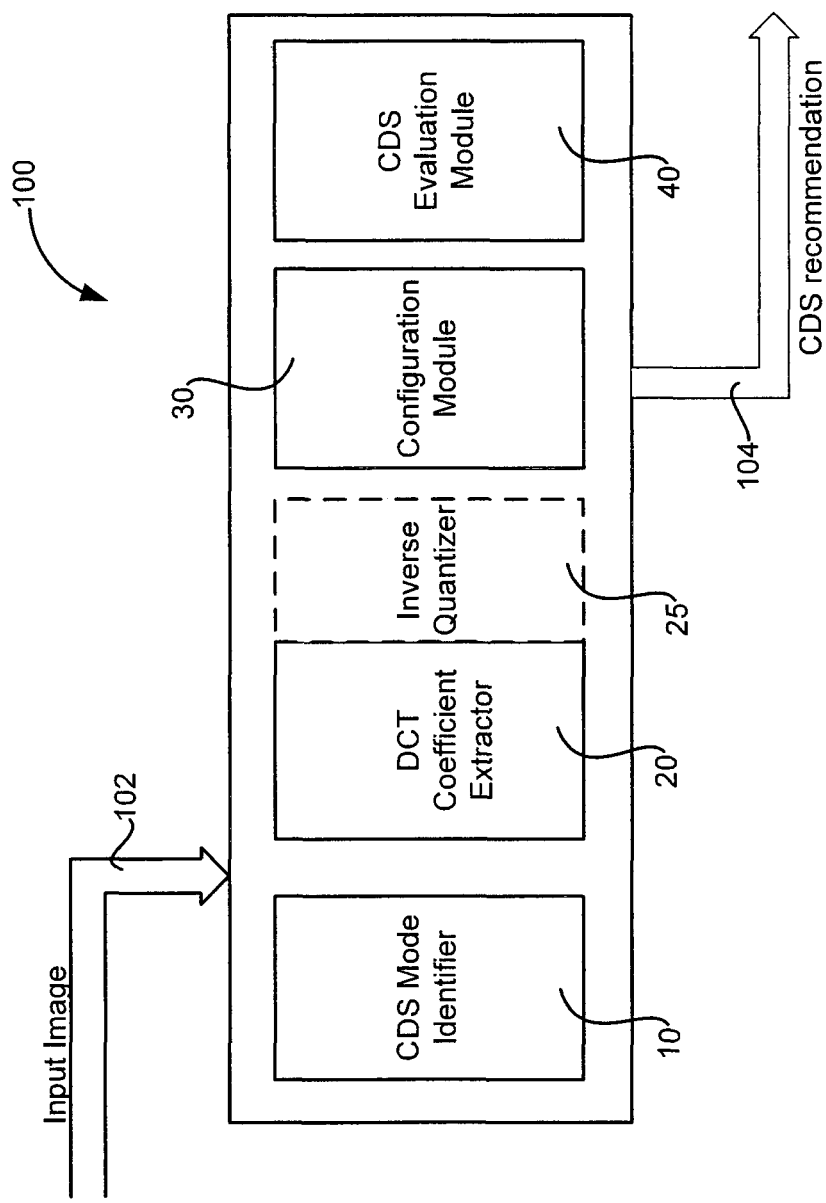
FIG. 1 is a block diagram of a system for evaluating an effect of chroma downsampling in a compression process of an input image, according to an example of the claimed subject matter.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of the claimed subject matter. However, it will be understood by those skilled in the art that the claimed subject matter may be practiced without these specific details. In other instances, well-known methods, procedures and components have not been described in detail so as not to obscure the claimed subject matter.

Unless specifically stated otherwise, as apparent from the following discussions, it is appreciated that throughout the specification discussions utilizing terms such as "processing", "classifying", "computing", "calculating", "evaluating", "determining", "compressing", "de-quantizing", "transforming", "generating", "identifying", "selecting" or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Examples of the claimed subject matter can include apparatuses for performing the operations herein. This apparatus may be specially constructed for the desired purposes, or it can comprise a general purpose computer selectively activated or reconfigured by a computer program stored in the computer. Such a computer program can be stored in a non-transitive computer readable storage medium, such as, but not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, examples of the claimed subject matter are not described with reference to any particular programming language. It will be appreciated that a variety of programming languages can be used to implement the teachings of the claimed subject matter described herein.

Throughout the description of the claimed subject matter and in the claims, reference is made interchangeably to the terms "chroma downsampling", "chroma subsampling" and "chroma spatial resolution reduction", or the like. The terms "chroma downsampling", "chroma subsampling" or "chroma spatial resolution reduction" are known in the art and the following definitions are provided for convenience purposes. The abbreviation "CDS" is used throughout the description and the claims interchangeable with any of the terms "chroma downsampling", "chroma subsampling" and "chroma spatial resolution reduction", or the like.

Throughout the description of the claimed subject matter and in the claims, reference is made to the term "CDS candidates group", or the like. The terms "CDS candidates group" as used herein relates to a group of blocks in an input image which are candidate for undergoing chroma downsampling. For example, in case a 4:2:0 chroma downsampling scheme is to be applied to an input image, each group of four blocks in the input image whose chroma components would be downsampled together and represented by a single block constitute a CDS candidates group. In another example, in case a 4:2:2 chroma downsampling scheme is to be applied to an input image, each group of two blocks in the input image whose chroma components would be downsampled together and represented by a single downsampled block constitute a CDS candidates group.

Throughout the description of the claimed subject matter and in the claims, reference is made to the term "target CDS block", or the like. The terms "target CDS block" as used herein relates to the block resulting from applying chroma downsampling to the blocks in the CDS candidate group from the original image.

Throughout the description of the claimed subject matter and in the claims, reference is made to the terms "compressed input image file" or the like. As used in the description and in the claims, this term relates to the computer resource that is used for storing and organizing any information which is required by the computer in order to render a compressed image. By way of example, a compressed input image file can include image data and metadata, where metadata includes compression data, which in turn includes details and data related to the compression that was applied to the image. The compression data may be required for decoding the image. For certain compressed images, the compression data can include a quantization matrix and/or a scaling factor (e.g., in case a scaled standard quantization matrix was used) that were used for the latest compression of the image, and which are required in order to reconstruct the image.

There is provided according to an aspect of the claimed subject matter a system and a method of evaluating an effect of chroma downsampling in a compression process of an input image. According to an example of the claimed subject matter, the method of evaluating an effect of chroma downsampling in a compression process of an input image can include: computing an error for a target CDS block based on characteristics of DCT coefficients in the U and/or V planes of a respective CDS candidates group in the input image, and further based on a diversity of the DCT coefficients in the U and/or V planes of the respective CDS candidates group in the input image; and computing an estimated perceptual effect of CDS over the input image based on a plurality of target CDS blocks error values.

Further by way of example of the claimed subject matter, the characteristics include an average of DCT coefficients in the U and/or V planes of the respective CDS candidates group. Still further by way of example of the claimed subject matter, diversity is characterized by a difference between values of DCT coefficients in the U and/or V planes of each one of the respective CDS candidates group and average of DCT coefficients in the U and/or V planes of the respective CDS candidates group.

Further examples of the claimed subject matter shall now be provided. Reference is now made to FIG. 1, which is a block diagram of a system for evaluating an effect of chroma downsampling in a compression process of an input image, according to an example of the claimed subject matter. According to an example, a system for evaluating an effect of chroma downsampling in a compression process of an input image 100 can include a CDS mode identifier 10, a DCT coefficient extract 20, a configuration module 30 and a CDS evaluation module 40. Further by way of example, the system 100 can receive an input image 102, process it and issue a recommendation with regard to an application of a CDS routine on the image, as will be described herein.

Figure 2:
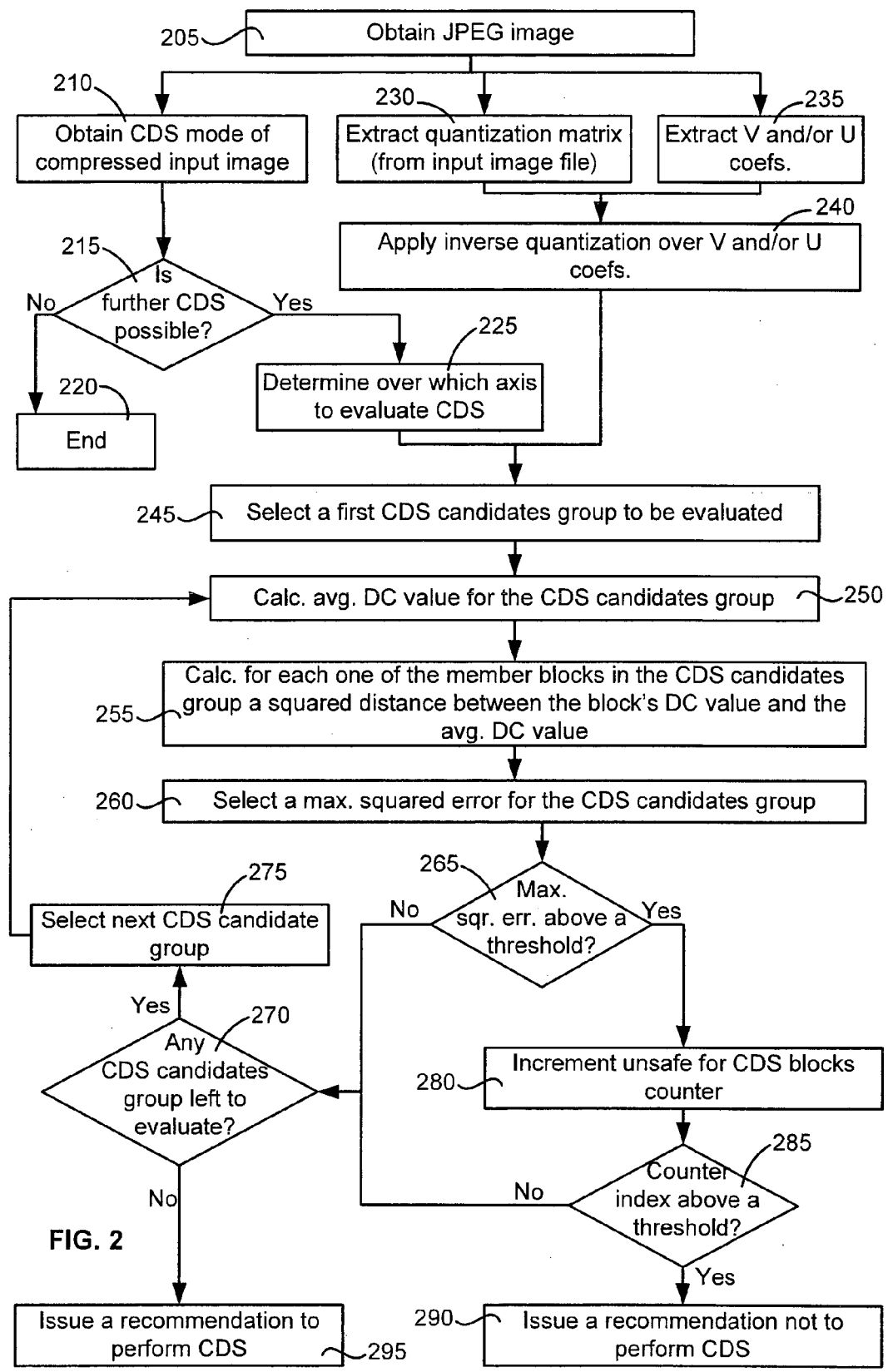
FIG. 2 is a flowchart illustration of a method of evaluating an effect of chroma downsampling in a compression process of a JPEG input image, according to an example of the claimed subject matter.

Reference is now additionally made to FIG. 2, which is a flowchart illustration of a method of evaluating an effect of chroma downsampling in a compression process of a JPEG input image, according to an example of the claimed subject matter. By way of example, a JPEG image may be obtained (block 205) and provided as input to the system 100. The input image 102 can be analyzed to determine its (current) CDS mode (block 210). In this regard, it would be appreciated that the input image 102 may be an image which has already been subjected to some degree CDS. For example, the input image 102 in FIG. 2 can be a JPEG image, and the input JPEG image could have undergone CDS in both axes, CDS in one of the horizontal or vertical axis, or the input image could be a JPEG image which had not undergone CDS at all. By way of example, for JPEG input images determining the CDS mode can be straightforward, since this information is usually available from the JPEG file itself. An example of a routine which can be used for determining a CDS mode of other types of images is described below.

By way of example, based on the current CDS mode of the input image 102 it can be determined whether further CDS is possible (block 215). Still further by way of example, in case the input image 102 is a JPEG image, if the JPEG image had already undergone CDS in both axis, no further CDS can be applied and the process would end (block 220), however if this is not the case, the process proceeds to block 225, where it is determined which over which axis CDS is to be evaluated. An example of a routine which may be used to determine over which axis CDS is to be evaluated is provided below. By way of example, blocks 210, 215, and 225 can be carried out by the CDS mode identifier 10

Possibly in parallel with the routine implemented for determining over which axis CDS is to be evaluated, and also in preparation for the actual evaluation process, blocks 230, 235 and 240 can be implemented. At block 230, the input JPEG's image quantization matrix can be obtained. For JPEG images, this information is also usually available from the JPEG file itself. At block 235, the V and/or U DCT coefficients of the input image can be obtained. At block 240, an inverse quantization may be applied to the V and/or U DCT coefficients of the input image giving rise to dequantized DCT coefficients in the V and/or U planes.

Once it is determined over which axis CDS is to be evaluated, and the dequantized DCT coefficients in the V and/or U planes are available, the process can proceed to the next block, where a first CDS candidate group is selected (for being evaluated) (block 245). By way of example, the selection of the first CDS candidate group to be evaluated can be carried out by the configuration module 30. Further by way of example, the configuration module 30 can be adapted to select a set of blocks which will be merged into a single block after the CDS is performed. Further by way of example if the evaluation is performed for down-sampling along both the horizontal and vertical axes, the first CDS candidates group can include the upper-most left-most block, the block to its right and the two blocks underneath these. Then, in each following evaluation, a corresponding set of 2×2 blocks can be used for the evaluation, and each time the next CDS candidate groups can be selected in accordance with a predefined pattern. In a different example, for instance if the evaluation is performed for down-sampling along the horizontal axis only, the first CDS candidates group can include the upper-most left-most block, the block to its right, and each following CDS candidates group of blocks include a similar pair of blocks which are selected in accordance with a certain predefined pattern.

An example of the CDS evaluation routine will now be described. By way of example, the evaluation routine can be carried out by the CDS evaluation module 40. By way of example, the evaluation routine can include computing an error for a target CDS block based on characteristics of DCT coefficients in the U and/or V planes of a respective CDS candidates group in the input image, and further based on a diversity of the DCT coefficients in the U and/or V planes of the respective CDS candidates group in the input image. An estimated perceptual effect of CDS over the input image can be computed based on a plurality of target CDS blocks error values.

Further by way of example of the claimed subject matter, the characteristics include an average of DCT coefficients in the U and/or V planes of the respective CDS candidates group. Still further by way of example of the claimed subject matter, diversity is characterized by a difference between values of DCT coefficients in the U and/or V planes of each one, of the respective CDS candidates group and average of DCT coefficients in the U and/or V planes of the respective CDS candidates group.

Further details according to one example of the evaluation routine shall now be described with reference to FIG. 2. By way of example, as part of the evaluation routine, an average of DCT DC coefficients in the U and/or V planes of the respective CDS candidates group may be calculated (block 250). Further by way of example, a difference between DCT DC values in the U and/or V planes of each one of the respective CDS candidates group and the average of DCT DC coefficients in the U and/or V planes of the respective CDS candidates group is calculated (block 255), and a maximum squared difference between DCT DC values in the U and/or V planes of each one of the respective CDS candidates group and the average of DCT DC coefficients in the U and/or V planes of the respective CDS candidates group is selected (block 260). For convenience this maximum squared difference is sometimes referred to herein as the error value for the CDS target block.

The error value for the CDS target block is compared against a threshold (block 265), and if the error value for the CDS target block is below the threshold, it is determined whether there are any CDS candidates groups left to evaluate (blocks 270). The threshold for the CDS target blocks can be determined by the configuration module 30, and it can be programmed into the CDS evaluation module 40. The CDS evaluation module 40 can use the threshold as part of the evaluation routine of each CDS candidates group. An example of the manner by which the threshold for the CDS target blocks error values can be determined shall described below.

If at block 265 it is determined that there are remaining CDS candidates groups to evaluate the next CDS candidates groups is selected (block 275), for example by CDS evaluation module 40, and the process returns to block 250. By way of example the selection of the next CDS candidates groups is performed according to a predefined pattern. Further by way of example, the selected of the next CDS candidates group is performed by continuing a raster scan of the DCT planes being used and selecting the next pair or foursome of CDS candidate blocks.

If, for any of the CDS candidates groups, it is determined at block 265 that the error value for the respective CDS target block is above the threshold, this CDS candidates group is regarded as being unsafe for CDS, and a counter which counts unsafe for CDS groups is incremented (block 280). After the counter is incremented, a second threshold which relates to the counter index is checked against a counter index threshold (block 285). By way of example, in a similar manner to the error value threshold, the counter index threshold can be determined by the configuration module 30, and it can be programmed into the CDS evaluation module 40. The CDS evaluation module 40 can use the counter index threshold as part of the evaluation routine of the input image. An example of the manner by which the threshold for the counter index can be determined shall described below.

If the counter index crosses the counter index threshold, it is determined that based on the evaluation routine it is not recommended to perform a CDS and the respective input image, and a recommendation to this effect is issued (block 290). If however, after the counter is incremented it is determined that the counter index does not (yet) cross the counter index threshold the process flow to block 270, where it is determined whether there are any CDS candidates groups left to evaluate. If there are more yet to be evaluated groups of CDS candidate blocks, the process returns to block 250 and the next group is evaluated. However if there are no more groups left to evaluate, it is determined that based on the evaluation routine it is estimated that CDS would not exceedingly reduce perceptual similarity between the input image and its chroma downsampled counterpart image, and a recommendation to this effect is issued (block 295).

According to an example of the claimed subject matter, the evaluation routine is carried out using the V plane DCT DC value only. Accordingly, by way of example, in block 235 only the DCT coefficients in the V plane are extracted, and possibly only the DCT DC coefficients in the V plane are extracted. At block 240, the inverse quantization can be limited to only the DCT coefficients in the V plane, or to the DCT DC coefficients in the V plane. Block 250-265 may also be configured and applied with respect to DCT coefficients in the V plane or to DCT DC coefficients in the V plane.

It would be appreciated, that working on the V plane DCT DC value can reduce complexity of the evaluation algorithm, while still providing a reliable output. The V component contains a large portion of the 'red data', and the inventors discovered that the V component exhibited higher importance in determining the perceptual effect of chroma downsampling. According to further examples of the claimed subject matter, using additional DCT coefficients and/or the U plane component as well may allow for finer tuning of the recommendation, at the price of higher complexity.

Further by way of example, if there are four blocks from the input image in a CDS candidates group, labeled as follows:

$B1 = B_{\{m,n\}}$, $B2 = B_{\{m+1,n\}}$, $B3 = B_{\{m,n+1\}}$, $B4 = B_{\{m+1,n+1\}}$

Assuming chroma downsampling is performed both on the vertical and the horizontal axes, the four blocks will become a single block. The (rounded) average DCT DC value in the V plane of this set is calculated as:

$$AVG_{DC} = \text{round}\left[\frac{B1_{DC} + B2_{DC} + B3_{DC} + B4_{DC}}{4}\right] \quad \text{Formula 1}$$

As will be explained below, by way of example, if the input image is already chroma downsampled in one direction, the average is calculated using only the two relevant blocks.

The error value for the CDS target block corresponding to blocks B1, B2, B3 and B4 (representing a CDS candidates group) can be calculated as follows:

$$E_{m/2,n/2} = {}_{i=1\ldots 4}^{max}(Bi_{DC} - AVG_{DC})^2 \quad \text{Formula 2}$$

If the input image is already downsampled in one direction then $\{i=1,2\}$, and either m or n are not halved.

If an $E_{m,n}$ error value for the CDS candidates group consisting of blocks B1, B2, B3 and B4 is above a first threshold, this CDS candidates group is regarded as being unsafe for CDS, and a counter which counts unsafe for CDS groups is incremented. The $E_{m,n}$ error value is calculated over the entire image. Optionally, a predefined pattern can be devised and used to provide a certain sub-set over the CDS candidates group, for example, such that only part of the image is processed as part of the classification process. As an example, the classification process may be carried-out on only the even values of m and n. If the counter counting the number of "unsafe for CDS" CDS candidates groups passes a second threshold, or in other words of if the counter passes the value N, representing N CDS candidates groups for which the E value exceed a threshold, it is determined that the input image should not undergo chroma subsampling.

For non-limiting illustration purposes, evaluating an example of the method according to the claimed subject matter on a large image database, has shown that a value of a first threshold, that is the threshold that is used to determine whether a given CDS candidates group should be regarded as being unsafe for CDS, or not, can be, for example: $T_E=10,000$. As mentioned above, this threshold value $T_E$ is used to evaluate the a maximum squared difference between DCT DC values in the V plane of each member block in the respective CDS candidates group and an average of the DCT DC coefficients in the V plane of the respective CDS candidates group.

Further by way of non-limiting example, and further according to the evaluation of an example of the method according to the claimed subject matter on a large image database, a second threshold which relates to the counter index can be, for example: N=10. In one example, evaluation of E, the error value for CDS candidates group in the input image, may stop after N CDS candidates group are discovered for which E is above the threshold. Using a threshold setting $T_E=10,000$ for the error value threshold, and a threshold setting N=10 for the counter index threshold, provided good discrimination, as measured by a subjective visual evaluation of the test images.

Reference is now made to FIG. 3 which is a graphical illustration of a data structure in which the results of a subjective CDS classification are listed for a plurality of image files, and for each of the plurality of image files, there is recorded the results of an application of three different thresholds for evaluating CDS target block error, according to an example of the claimed subject matter. According to an example of the claimed subject matter, the threshold for evaluating a CDS target block error can be determined empirically, using such data, as will now be explained in further detail.

Further by way of example, the perceptual effect of chroma downsampling over a collection of test images (or image files) can be evaluated. For example, one or more human evaluators may be requested to evaluate the effect of chroma downsampling over a collection of test images. The collection of test images may be chroma downsampled, and the human evaluator may be requested to indicate whether based on his/her subjective impression there is any perceptual difference among the chroma downsampled image and its corresponding input image. If there is more than one evaluator, a common result can be obtain through any known statistical processing method, in a manner known per se. In FIG. 3 the results of such evaluation are summarized in the second from left column, where if there was no perceptual change as a result of, chroma downsampling an input image, the entry for the respective image is "OK", but if there was a perceptual change, the entry for the respective image is "NOT OK". In FIG. 3 the perceptual similarity of the images was evaluated at 100% zoom and for CDS in both the chroma axes. It would be appreciated that other ratios can be used for evaluating perceptual similarity between the images. It would be also appreciated, that perceptual similarity can be evaluated for chroma downsampling in only one of the axes. Furthermore, it would be appreciated that perceptual similarity can be evaluated for each possible chroma downsampling mode (e.g., CDS in both the chroma axes, CDS in the horizontal axis only and CDS in the vertical axis only).

It would be appreciated that instead of or in addition to using human evaluator, a perceptual quality measure can be used and the process can be made automatic or semi-automatic. An automatic evaluation process that is based on a perceptual quality measure can, for example, involve up-sampling of the downsampled chroma planes to their original spatial resolution, which is required for alignment between the reference i.e. the original chroma plane and the down-sampled one, followed by a calculation of a known distortion measure such as, but not limited to, PSNR (Peak Signal-to-Noise Ratio), SSIM (Structural Similarity Index Measure) or VIF (Visual Information Fidelity). Further examples of perceptual quality measures which can be used include: a perceptual similarity measure which includes an added artifactual edges measure, and a perceptual similarity measure which is based on a combination of a texture measure and a local similarity measure. The latter perceptual quality measures are disclosed in U.S. Provisional Application No. 61/329,217, filed on Apr. 29, 2010, which is hereby incorporated by reference in its entirety. The latter perceptual quality measures are also disclosed in U.S. Provisional Application No. 61/383,750, filed on Sep. 17, 2009, which is hereby incorporated by reference in its entirety. The latter perceptual quality measures are also disclosed in a PCT application entitled "Apparatus and Methods for Recompression of Digital Images", which is filed on the same date as the present application and is hereby incorporated by reference in its entirety.

In FIG. 3, three different thresholds for evaluating CDS target block error were used to calculate three different CDS target blocks error rates for each one of the images in the test set. Possible values for the thresholds used in FIG. 3 can be the following: THR1=5000, THR2=10000 and THR3=50000. According to an example of the claimed subject matter, for each CDS target block, an error value can calculated as the maximum squared difference between DCT DC values in the V plane of the respective CDS candidates group and the average of DCT DC coefficients in the V plane of the CDS candidates group. Further in accordance with the example illustrated in FIG. 3, based on each of the three thresholds (THR1=5000, THR2=10000 and THR3=50000), for each of the images in the test set, the number of target CDS blocks for which the error value exceeds the respective threshold is recorded in a respective column of the data structure.

The results for each of the three thresholds can then be evaluated, and a threshold which provides a good distinction among images that have been evaluated as "OK" for CDS and images that have been evaluated as "NOT OK" for CDS is selected. The evaluation of the results for each of the three thresholds can be carried out manually, or through a dedicated algorithm designed for this purpose and implemented on a computer.

For example, looking at the results for the three threshold in FIG. 3, the results show that THR1 is too low and many blocks exceed it whether or not they are perceptually lossless under CDS. THR3 is too high so few blocks exceed it even when CDS causes perceptual loss, whereas THR2 allows reliable classification for this test set by classifying any image with at least 10 CDS target blocks for which the respective error value exceeds the threshold as not recommended for CDS. In this manner, the threshold for evaluating CDS target block error can be used to determine a counter index threshold. As mentioned above, the counter index threshold is used to indicate whether an input image is safe for CDS or not based on the number of CDS target blocks (or CDS candidates group) for which the error value is above or below a given CDS target block error threshold (and the CDS target block error threshold is associated with the counter index threshold).

Referring to the example shown in FIG. 3, THR2=10000 can be selected as the CDS target block error threshold and the respective counter index threshold is then 10. Any image for which the number of CDS target blocks, whose error value exceeds the target CDS block error threshold, is 10 or above is regarded as "NOT OK" for CDS, and for such an image a recommendation not to perform CDS shall be issued. Similarly, any image for which the number of CDS target blocks, whose error value exceeds the target CDS block error threshold, is below 10 is regarded as "OK" for CDS, and for such an image a recommendation to perform CDS shall be issued.

In FIG. 3, by way of example, all the evaluations underlying the values and entries in the data structure were performed with respect to CDS in both axes. It would be appreciated that for CDS in the vertical axis only and for CDS in the horizontal axis only similar evaluation may be performed, such that for each CDS mode a CDS target block error threshold and a respective index counter threshold are provided. According to an example of the claimed subject matter, the CDS target block error threshold and the respective index counter threshold that are used by the process of classifying chroma downsampling can be selected according to the chroma downsampling method that is being evaluated, and if more than one CDS mode is evaluated, the thresholds can be updated in transition from evaluating one CDS mode to the next.

In FIG. 3, a small test set was shown, as an example. It would be appreciated that many more images can be evaluated in order to obtain more accurate and more credible thresholds. Furthermore, by way of example, more or less than three candidate target CDS blocks error thresholds can be evaluated (for each of the CDS modes).

In FIG. 2 and in the description thereof, the input image was a JPEG image. In JPEG images, the DCT coefficient in each of the Y, U and V planes can be extracted from the input image in a straight forward manner. There is now described with reference to FIG. 4, which is a flow chart illustration a method of evaluating an effect of chroma downsampling in a compression process of an input image, which includes conversion of image to RAW Y, U and V components and using the RAW Y, U and V components in the evaluation, according to an example of the claimed subject matter.

Figure 4:
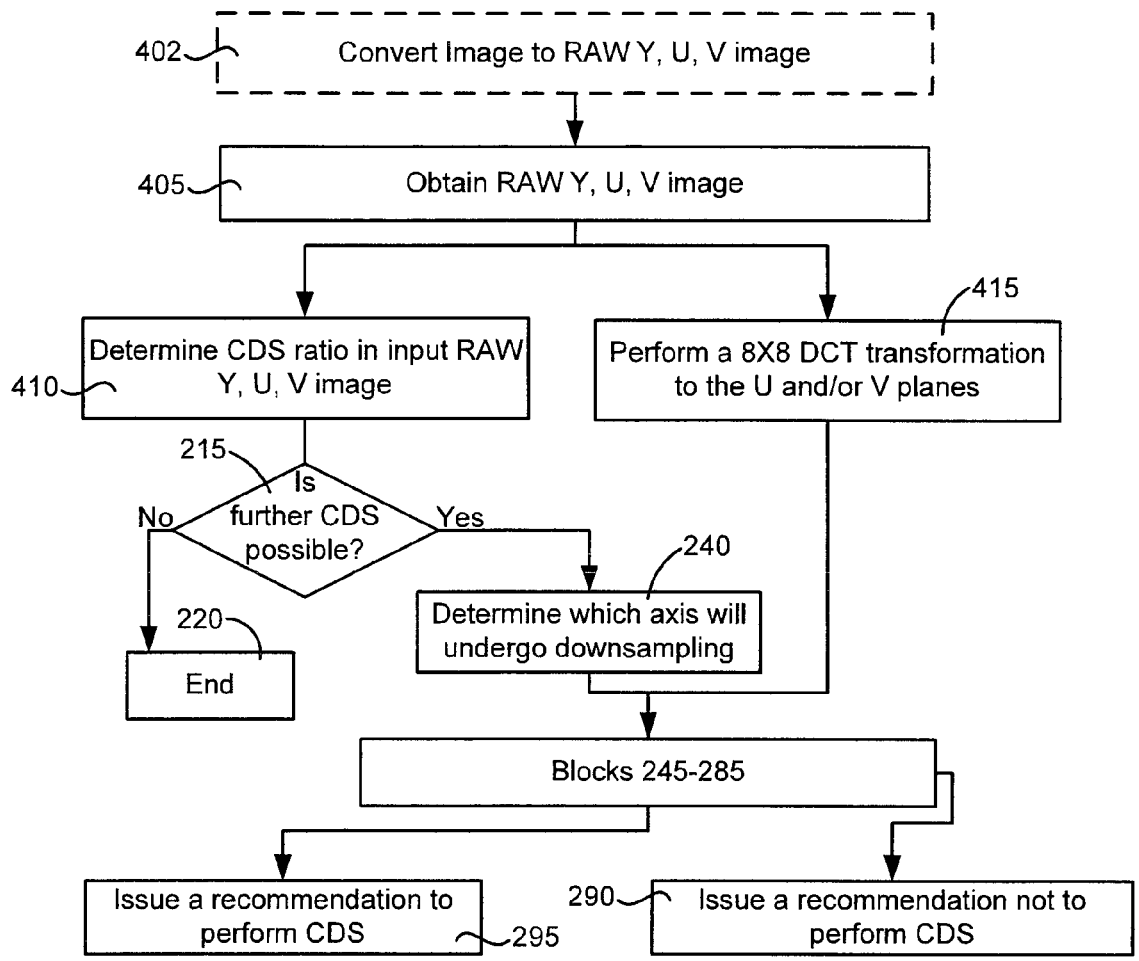
FIG. 4 is a flow chart illustration a method of evaluating an effect of chroma downsampling in a compression process of an input image, which includes conversion of image to RAW Y, U and V components and using the RAW Y, U and V components in the evaluation, according to an example of the claimed subject matter.

In FIG. 4, an input image is processed to obtain respective RAW Y, U and V components of the input image (block 405). In an example, an optional preliminary conversion of the image into RAW Y, U and V components can be implemented (block 402). For example, in case the image is a RAW RGB image the RAW Y, U and V components can be calculated by applying the known RGB to YUV color transform, possibly as defined by CCIR 601 a.k.a. ITU-T BT.601. It would be appreciated that calculating RAW Y, U and V components for an input image is a process that is known in the art.

Once the RAW Y, U and V components are obtained, to process can proceed to blocks 410 and 415. At block 410, the CDS ratio in the input image is determined based on the RAW Y, U and V components, for instance by comparing their spatial resolution. At block 415, a 8×8 DCT transformation is performed in the U and V components to obtain the DCT coefficients in the V and/or U planes. As mentioned above, it may be sufficient to obtain the DCT coefficients in the V plane only. It would be appreciated that this can be sufficient and will result in lower complexity, since the DC is essentially a scaled average of the original values. However as this procedure will most commonly be used in the context of image compression, where DCT is required in any case (although possibly only for the reduced size plane, i.e., after chroma down-sampling), the DCT transformation may be carried out over the entire DCT matrix.

According to an example of the claimed subject matter, following block 410, where the CDS ratio in the input image is determined based on the RAW Y, U and V components, it may be determined whether further CDS is possible, in substantially the same manner as was described above with reference to block 215. If it is determined that no further CDS is possible the process is terminated, substantially in the same manner as was described above with reference to block 220. If however further CDS is possible, the process can proceed substantially according to blocks 240-295 that were described above, and using the DCT coefficients in the V and/or U planes and based on the CDS ratio in the input image, it may be determined whether to issue a recommendation to perform CDS (block 295) or to issue a recommendation not to perform CDS (block 290).

It would be appreciated that while it is possible that only the V component would be calculated (e.g., when the input image is in RGB format), but in many cases the full conversion to the YUV space would be a byproduct of the main process (e.g., compression including CDS or conversion to the YUV space), and the classification process would be implemented as a control measure that is used to configure the main process. Under such circumstances, YUV calculation would need to be performed in any case.

Figure 5:
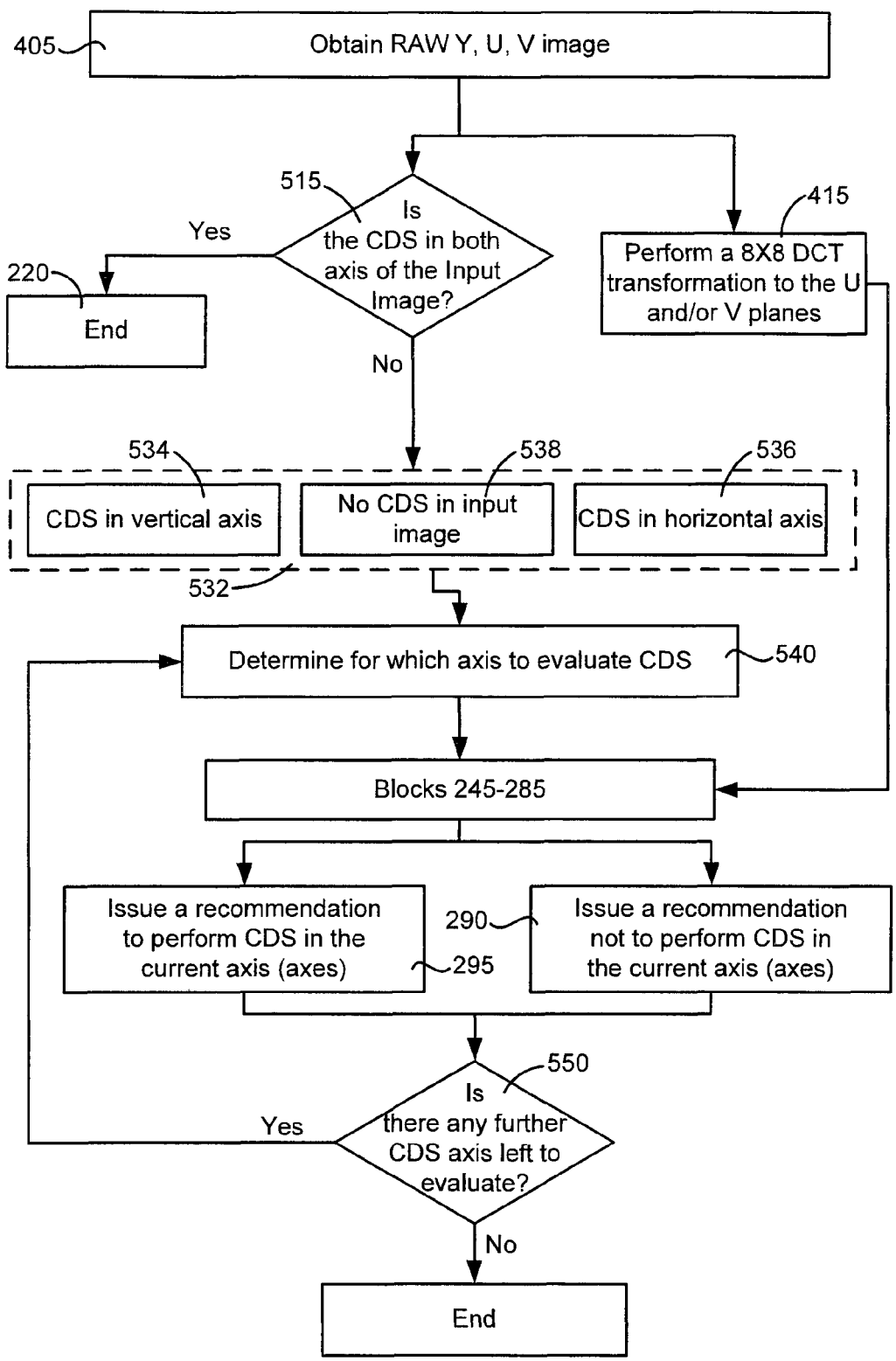
FIG. 5 is a flow chart illustration of a method of evaluating an effect of different modes of chroma downsampling in a compression process of an input image, in accordance with an example of the claimed subject matter.

Reference is now made to FIG. 5, which is a flow chart illustration of a method of evaluating an effect of different modes of chroma downsampling in a compression process of an input image, in accordance with an example of the claimed subject matter. According to an example of the claimed subject matter, say that a process of evaluating an effect of chroma downsampling in a compression process of an input image begins with an input of the RAW Y, U and V components corresponding to the input image, in substantially the same manner as was described above with reference to block 405. A 8×8 DCT transformation is performed in the U and V components to obtain the DCT coefficients in the V and/or U planes, in substantially the same manner as was described above with reference to block 415. It would be appreciated that the process illustrated in FIG. 5 can be used for classifying JPEG images as well, and in this case, for example, block 205 can replace block 405 and blocks 230-240 can replace block 415.

According to an example of the claimed subject matter, in addition and possibly in parallel with block 415, it may be determined whether CDS was applied in both axis of the input image (block 515). A similar routine as that which was described with reference to block 410 (to determine the CDS ratio in the input image) can be used to determine whether CDS was applied in both axis of the input image. If it is determined that CDS was applied in both axis of the input image, the process is terminated substantially in the same manner as was described above with reference to block 220. If however, it is determined that CDS was not applied in both axes, the process moves to block 532, where it is determined which of the CDS modes was applied to the input image, and subsequently it is determined over which axis to evaluate an effect of applying CDS (or further CDS) to the input image (block 540).

Returning to block 532, by way of example, the possible input image CDS modes are: CDS in the vertical axis (block 534), CDS in the horizontal axis (block 536), or no CDS (block 538). For example, if CDS was already applied to the input image in one of the axis (e.g. vertical or horizontal), at block 540 CDS in the other axis can be evaluated. Further by way of example, if no CDS was applied to the input image (block 538), the CDS evaluation module can initially evaluate the effect of CDS in both axis over the input image. Further by way of example, if no CDS was applied to the input image (block 538), and it is determined that applying CDS in both axes over the input image is not recommended, the evaluation routine can be reconfigured so that the routine is repeated but this time it is used to evaluate the effect of applying CDS in one of the axes (say vertical). Still further by way of example, if no CDS was applied to the input image (block 538), and it is determined that applying CDS in both axes over the input image is not recommended, and it is further determined that applying CDS in one of the two axes (say horizontal) is also not recommended, the evaluation routine can be reconfigured so that the routine is repeated but this time it is used to evaluate the effect of applying CDS in the other one of the two axes (say vertical).

Once it is determined at block 540 whether to evaluate an effect of applying CDS (or further CDS) over both axes or over one of the axis (and in this case, over which one), the process can proceed substantially according to blocks 240-295, that were described above, and the process can return an evaluation whether it is recommended (block 295) or not (block 290) to perform CDS in both axes or in the respective axis.

At block 550 it is determined whether there is any more axis to evaluate and if yes, the next axis to be evaluated is determined at block 540, and blocks 240-295 are repeated. Such possible further evaluation was mentioned above by way of example. At the end of the process the recommendations may be consolidated if necessary.

Figure 6A:
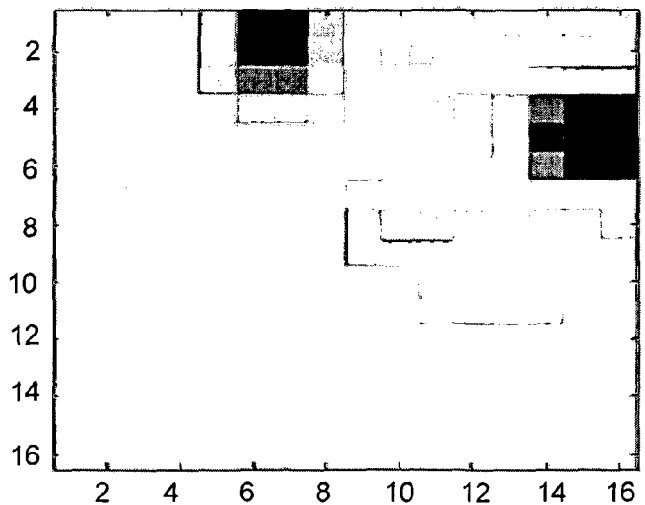
FIGS. 6A-6D collectively show a non-limiting illustration of certain aspects of a method evaluating an effect of chroma downsampling in a compression process, according to an example of the claimed subject matter.
Figure 6B:
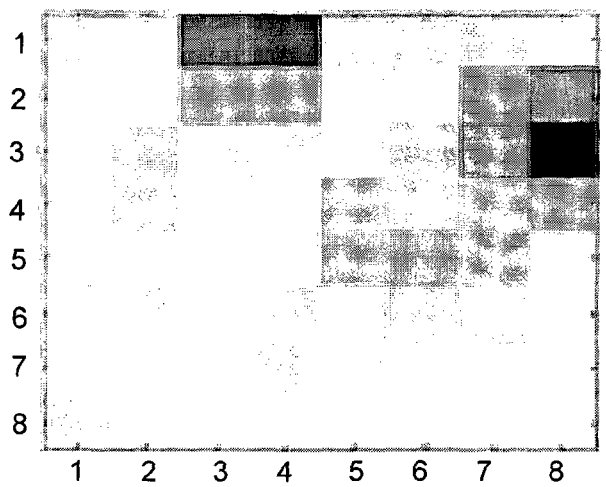

Reference is now made to FIGS. 6A-6D which provide a non-limiting illustration of certain aspects of a method evaluating an effect of chroma downsampling in a compression process, according to an example of the claimed subject matter. Initially, the Original V plane DCT values—after inverse quantization are obtained. In FIGS. 6A and 6B a 4:2:0 CDS mode is evaluated (CDS in both axes), and so the V plane DCT values 605 of four adjacent blocks are shown, as an example. The four adjacent blocks form a CDS candidates group.

The (rounded) average DCT DC value in the V plane are calculated, for example using Formula 1, and the result in this case is 123. Using, for example, Formula 2, the four squared errors are calculated for each member block of the CDS candidate group: $(105-123)^2=324$; $(42-123)^2=6561$; $(182-123)^2=3481$; $(161-123)^2=1444$, and the maximum value: 6561 is identified. This is a relatively large error for the target CDS. Matrix 610 illustrates the corresponding pixel values before chroma downsampling is applied and image 615 represents the respective portion of the corresponding image. In FIG. 6B, the pixels after downsampling 620 are shown, together with the corresponding DCT values (prior to quantization) 625 and the respective portion of the corresponding image 630. For example, it is assumed that the error value (6561) for the CDS target block when performing CDS subsampling in both axes is high, and it represents the entire image, so a recommendation is issued not to apply CDS in both axes of the input image.

Figure 6C:
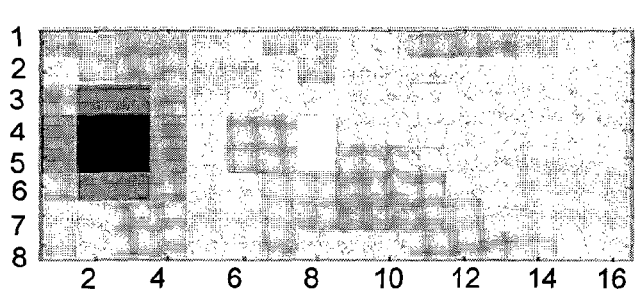
Figure 6D:
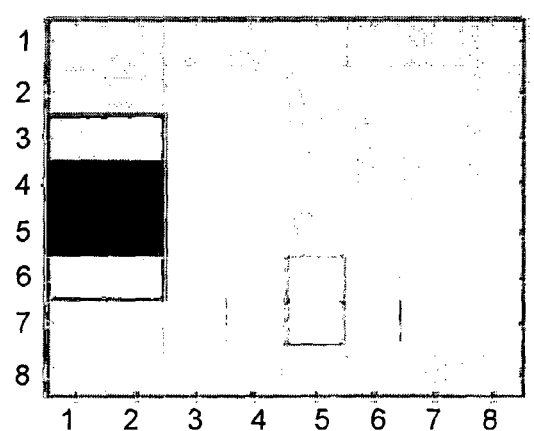

For the sake of illustration, lets assume the number of target CDS blocks whose error value is above the threshold is larger than the counter index threshold, and in this case, it is recommended not to perform CDS in both axes, and the process moves to determine whether it is recommended to apply CDS in the horizontal axis. In FIGS. 6C-6D a 4:2:2 CDS mode is evaluated (CDS in the horizontal plane), and so the V plane DCT values 635 of two horizontally adjacent blocks are shown, as an example. The two adjacent blocks form a CDS candidates group.

The (rounded) average DCT DC value in the V plane are calculated, for example using Formula 1, and the result in this case is 119. Using, for example, Formula 2, the two squared errors are calculated for each member block of the CDS candidate group: $(70-119)^2=2401$; $(167-119)^2=230$, and the maximum value: 2401 is identified. This is a relatively small error for the target CDS. Matrix 640 illustrates the corresponding pixel values before chroma downsampling is applied and image 645 represents the respective portion of the corresponding image. In FIG. 6B, the pixels after downsampling 650 are shown, together with the corresponding DCT values (prior to quantization) 655 and the respective portion of the corresponding image 660. For example, it is assumed that the error value (2401) for the CDS target block when performing CDS subsampling in the horizontal axis is low, and it represents the entire image, so a recommendation can be issued to apply CDS in the horizontal plane to the input image.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

The invention claimed is:

1. A method of evaluating an effect of chroma downsampling in a compression process of an input image, comprising:
computing, using a CDS evaluation module, an error for a target CDS block based on characteristics of DCT coefficients in U and/or V planes of a respective CDS candidates group in the input image, and further based on a diversity of the DCT coefficients in the U and/or V planes of the respective CDS candidates group in the input image; and
computing, using said CDS evaluation module, an estimated perceptual effect of CDS over the input image based on a plurality of target CDS blocks error values, wherein said characteristics include an average of DCT coefficients in the U and/or V planes of the respective CDS candidates group.

2. The method according to claim 1, wherein said diversity is characterized by a difference between values of DCT coefficients in the U and/or V planes of each member block in the respective CDS candidates group and said average.

3. The method according to claim 2, wherein said characteristics are an average of DCT DC coefficients in the U and/or V planes of the respective CDS candidates group.

4. The method according to claim 3, wherein said diversity is based on a maximum difference between DCT DC values in the U and/or V planes of each one of the respective CDS candidates group and said average of DCT DC coefficients in the U and/or V planes of the respective CDS candidates group.

5. The method according to claim 4, wherein said diversity is a maximum squared difference between DCT DC values in the U and/or V planes of each member block in the respective CDS candidates group and said average of DCT DC coefficients in the U and/or V planes of the respective CDS candidates group.

6. The method according to claim 5, wherein said computing an estimated perceptual effect of CDS over the input image includes summing a plurality of error values associated with a respective plurality of target CDS blocks.

7. The method according to claim 6, further comprising:
applying a CDS control threshold; and
controlling chroma downsampling during compression of the input image based on a relation among the CDS control threshold and the CDS error for the input image.

8. The method according to claim 7, wherein the compression process supports a plurality of chroma downsampling modes, and wherein said computing an error for a target CDS block, said computing an estimated perceptual effect of CDS over the input image, and said applying a CDS control threshold, are implemented and configured one or more times to provide a selection among the plurality of chroma downsampling modes.

9. The method according to claim 8, wherein during a first application of said computing an error for a target CDS block, said computing an estimated perceptual effect of CDS over the input image, and said applying a CDS control threshold, it is determined whether a first mode of chroma downsampling should be applied or not, and wherein during said first application, the CDS candidates group is defined in accordance with said first mode of chroma downsampling.

10. The method according to claim 9, wherein during a second application of said computing an error for a target CDS block, said computing an estimated perceptual effect of CDS over the input image, and said applying a CDS control threshold, it is determined whether a second chroma downsampling mode should be applied or not, and wherein the CDS candidates group is defined according to said second mode of chroma downsampling.

11. The method according to claim 7, wherein said computing an error for a target CDS block, said computing an estimated perceptual effect of CDS over the input image, and said applying a CDS control threshold are applied to and are based on DCT coefficients in the V plane only.

12. The method according to claim 1, wherein said characteristics include an average of DCT DC coefficients in the V plane of the respective CDS candidates group.

13. The method according to claim 12, wherein said diversity is characterized by a difference between values of DCT DC coefficients in the V plane of each member block in the respective CDS candidates group and said average.

14. The method according to claim 13, wherein said characteristics are an average of DCT DC coefficients in the V plane of the respective CDS candidates group.

15. The method according to claim 14, wherein said diversity is based on a maximum difference between DCT DC values in the V plane of each one of the respective CDS candidates group and said average of DCT DC coefficients in the V plane of the respective CDS candidates group.

16. The method according to claim 15, wherein said diversity is a maximum squared difference between DCT DC values in the V plane of each member block in the respective CDS candidates group and said average of DCT DC coefficients in the V plane of the respective CDS candidates group.

17. A computerized apparatus for evaluating an effect of chroma downsampling in a compression process of an input image, comprising:
a CDS coefficients extractor adapted to obtain DCT coefficients corresponding to the input image;
a CDS evaluation module adapted to compute an error for a target CDS block based on characteristics of DCT coefficients in U and/or V planes of a respective CDS candidates group in the input image, and further based on a diversity of the DCT coefficients in the U and/or V planes of the respective CDS candidates group in the input image; and
said CDS evaluation module is adapted to compute an estimated perceptual effect of CDS over the input image based on a plurality of target CDS blocks error values,
wherein said characteristics include an average of DCT coefficients in the U and/or V planes of the respective CDS candidates group.

18. The apparatus according to claim 17, wherein said diversity is characterized by a difference between values of DCT coefficients in the U and/or V planes of each member block in the respective CDS candidates group and said average.

19. The apparatus according to claim 18, wherein said characteristics are an average of DCT DC coefficients in the U and/or V planes of the respective CDS candidates group.

20. The apparatus according to claim 19, wherein said diversity is based on a maximum difference between DCT DC values in the U and/or V planes of each one of the respective CDS candidates group and said average of DCT DC coefficients in the U and/or V planes of the respective CDS candidates group.

21. The apparatus according to claim 20, wherein said diversity is a maximum squared difference between DCT DC values in the U and/or V planes of each member block in the respective CDS candidates group and said average of DCT DC coefficients in the U and/or V planes of the respective CDS candidates group.

22. The apparatus according to claim 21, said CDS evaluation module is adapted to sum a plurality of error values associated with a respective plurality of target CDS blocks as part of the estimation of the perceptual effect of CDS over the input image.

23. The apparatus according to claim 22, wherein said CDS evaluation module is adapted to apply a CDS control threshold, and said CDS evaluation module is configured to issue a recommendation with regard to a possibility of applying of CDS over the input image based on a relation among the CDS control threshold and the CDS error for the input image.

24. The apparatus according to claim 23, wherein said CDS evaluation module is configured to evaluate a plurality of chroma downsampling modes, and is adapted to compute an error for a target CDS block, and to compute an estimated perceptual effect of CDS over the input image, and to apply a CDS control threshold one or more times to provide a selection among the plurality of chroma downsampling modes.

25. The apparatus according to claim 24, wherein said CDS evaluation module is adapted to initially evaluate in a first evaluation an application of a first mode of CDS over the input image, and wherein during said first evaluation said CDS evaluation module is configured to relate to CDS candidates groups which are defined in accordance with said first mode of chroma downsampling.

26. The apparatus according to claim 25, wherein said CDS evaluation module is adapted to evaluate in a second evaluation an application of a second mode of CDS over the input image and wherein during said second evaluation said CDS evaluation module is configured to relate to CDS candidates groups which are defined in accordance with said second mode of chroma downsampling.

27. The apparatus according to claim 23, wherein said CDS evaluation module is configured to compute an error for a target CDS block and to compute an estimated perceptual effect of CDS over the input image based on DCT coefficients in the V plane only.

28. The apparatus according to claim 27, wherein said CDS evaluation module is configured to compute an error for a target CDS block and to compute an estimated perceptual effect of CDS over the input image based on DCT DC coefficients in the V plane only.

* * * * *